(12) United States Patent
Chowdhary et al.

(10) Patent No.: US 9,916,749 B2
(45) Date of Patent: *Mar. 13, 2018

(54) SYSTEM TO MONITOR AN AMOUNT OF MATERIAL IN A CONTAINER

(71) Applicant: ECONOMY MUD PRODUCTS COMPANY, Houston, TX (US)

(72) Inventors: Manjit Chowdhary, Missouri City, TX (US); Walter White, Houston, TX (US); Bobby Hyatt, Angleton, TX (US)

(73) Assignee: Economy Mud Product Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,985

(22) Filed: Feb. 19, 2016

(65) Prior Publication Data

US 2016/0171870 A1 Jun. 16, 2016

Related U.S. Application Data

(63) Continuation of application No. 13/205,961, filed on Aug. 9, 2011, now Pat. No. 9,267,834.

(51) Int. Cl.
| | |
|---|---|
| *G08B 21/00* | (2006.01) |
| *G08B 21/18* | (2006.01) |
| *G01F 23/284* | (2006.01) |
| *G01F 23/30* | (2006.01) |
| *G08B 5/22* | (2006.01) |
| *H04L 29/08* | (2006.01) |

(52) U.S. Cl.
CPC ......... *G08B 21/182* (2013.01); *G01F 23/284* (2013.01); *G01F 23/303* (2013.01); *G08B 5/22* (2013.01); *H04L 67/025* (2013.01); *H04L 67/18* (2013.01)

(58) Field of Classification Search
CPC ... G08B 21/182; G01F 23/284; G01F 23/303; H04L 67/025; H04L 67/18
USPC .......................................................... 340/612
See application file for complete search history.

(56) References Cited

U.S. PATENT DOCUMENTS

| | | | |
|---|---|---|---|
| 8,400,320 B2 * | 3/2013 | Santos ................ | G01F 23/0076 340/501 |
| 8,665,083 B2 * | 3/2014 | Easley .................. | G08B 25/10 340/511 |
| 2001/0021563 A1 * | 9/2001 | Ma .................... | H01L 21/28273 438/393 |

(Continued)

FOREIGN PATENT DOCUMENTS

EP 1760739 A2 * 3/2007 ........... H01H 13/705

*Primary Examiner* — George Bugg
*Assistant Examiner* — Anthony D Afrifa-Kyei
(74) *Attorney, Agent, or Firm* — Rao DeBoer Osterrieder, PLLC; John M. DeBoer

(57) ABSTRACT

Embodiments of the disclosure pertain to a system effective to monitor an amount of a material that includes a portable container, wherein the material is within the portable container; a sensor in the portable container, the sensor effective to detect a first level of the material in the portable container when the portable container is at a first location and to generate a first data signal based on the first level; and a processor in communication with the sensor, the processor effective to receive the first data signal and effective to generate a report based on the first data signal, the report relating to an amount of the material in the container.

11 Claims, 2 Drawing Sheets

(56) References Cited

U.S. PATENT DOCUMENTS

2010/0023162 A1* 1/2010 Gresak .................... B67D 7/08
                     700/241

* cited by examiner

SYSTEM TO MONITOR AN AMOUNT OF MATERIAL IN A CONTAINER

STATEMENT REGARDING FEDERALLY SPONSORED RESEARCH OR DEVELOPMENT

Not Applicable

BACKGROUND

Field of the Disclosure

This disclosure relates to a system and method for monitoring chemicals, such as fracturing chemicals, agriculture chemicals or any other related industries, stored in portable containers.

Background of the Disclosure

In a subterranean stimulation formation process, such as fracturing, one or more chemicals may be applied to a subterranean formation. The chemicals may each be stored in respective containers. As the formation process continues, an amount of each chemical in a respective container will change. Eventually, at least some of these chemicals may need to be replenished.

SUMMARY

Embodiments of the disclosure pertain to a system effective to monitor an amount of material in a portable container. The system comprises a container, a material in the container and a sensor in the container. The sensor is effective to detect a first level of the material in the container when the container is at a first location and to generate a first data signal based on the first level, detect a second level of the material in the container when the container is at a second location and to generate a second data signal based on the second level, and send the first and second data signal to a processor. The system includes a processor in communication with the sensor, the processor effective to receive the first and second data signal and effective to generate a report based on the first and the second data signal, the report relating to an amount of the material in the container.

Another embodiment of the disclosure pertains to a method for monitoring an amount of material in a portable container. The method comprises detecting, by a sensor, a first level of material in a container when the container is at a first location. The method further comprises generating, by the sensor, a first data signal based on the first level. The method further comprises detecting, by the sensor, a second level of the material in the container when the container is at a second location. The method further comprises generating, by the sensor, a second data signal based on the second level. The method further comprises receiving, by a processor in communication with the sensor, the first and the second data signal. The method further comprises generating a report based on the first and the second data signal, the report relating to an amount of the material in the container.

Yet another embodiment of the disclosure pertains to a system effective to monitor an amount of material in a portable container. The system comprises a truck, the truck including a cab and a trailer. The system further comprises a container in the trailer. The system further comprises a material in the container. The system further comprises a sensor in the container, the sensor effective to detect a first level of the material in the container when the container is at a first location and to generate a first data signal based on the first level, detect a second level of the material in the container when the container is at a second location and to generate a second data signal based on the second level, and send the first and second data signal to a processor. The system further comprises a first processor in the cab, the first processor in communication with the sensor, the first processor effective to receive the first and second data signal and effective to generate a report based on the first and the second data signal, the report relating to an amount of the material in the container. The first processor effective to send the report over a network to a second processor.

In still yet other embodiments of the disclosure there may be a system effective to monitor an amount of a material that may include a portable container, wherein the material may be within the portable container; a sensor may be in the portable container, the sensor may be effective to detect a first level of the material in the portable container when the portable container is at a first location, and the sensor may be effective or configured to generate a first data signal based on the first level. There may be a processor in communication with the sensor. The processor may be effective to receive the first data signal and effective to generate a report based on the first data signal. The report may relate to an amount of the material in the container.

The sensor may be configured, operable, effective, etc. to detect a second level of the material in the portable container when the portable container is at a second location and to generate a second data signal based on the second level. The sensor may send the first data signal and the second data signal to the processor. The report may be further based on the second data signal.

There may be a second portable container. At least one of the first portable container and the second portable container may be located on a transport vehicle.

The processor may be in communication with a database. The processor may be effective to generate an alarm when the first amount is below a threshold. The processor may be effective to send the report over a network to a phone.

The report may include information related to a change in the amount. The processor may be in a cab of the transport vehicle. At least one of the first portable container and the second portable container may be in a trailer of the transport vehicle.

The report may include a map indicating a location of the transport vehicle. The report may include information about a change in the amount of the material.

In aspects, the processor may be a first processor. The system may include a second processor. The first processor may be effective to send the report over a network to the second processor. The second processor may be effective to display the report on a display. The second processor may be effective to communicate with the first processor using a web interface.

In still yet other embodiments the disclosure pertains to a method for monitoring an amount of material in a portable container that may include the steps of detecting, by a sensor, a first level of material defined by a first amount of the material in a container when the container is at a first location; generating, by the sensor, a first data signal based on the first level; detecting, by the sensor, a second level of the material defined by a second amount of the material in the container when the container is at a second location; generating, by the sensor, a second data signal based on the second level; receiving, by a processor in communication with the sensor, the first and the second data signal; generating a report based on the first and the second data signal, the report relating to an amount of the material in the container; determining by the processor that the first amount is below a threshold; and generating an alarm by the processor.

In aspects, the processor may be a first processor. The method may further include sending the report over a network from the first processor to a second processor; and displaying the report on a display by the second processor. The report may include information about the first amount and the second amount. The report may include an indication of a change between the first amount of and the second amount.

In yet another embodiment the present disclosure pertains to a system effective to monitor an amount of material that may include a truck further comprising a cab and a trailer; a container in the trailer; a material in the container; a sensor in the container, the sensor effective to detect a first level of the material defined by a first amount of the material in the container when the container is at a first location and to generate a first data signal based on the first level, detect a second level of the material defined by a second amount of the material in the container when the container is at a second location and to generate a second data signal based on the second level, and send the first and second data signal to a processor; and a first processor in the cab, the first processor in communication with the sensor, the first processor effective to receive the first and second data signal and effective to generate a report based on the first and the second data signal, the report relating to an amount of the material in the container; the first processor effective to send the report over a network to a second processor.

The processor may be in communication with a database. The processor may be configured, effective, operable, programmed, etc. to generate an alarm when the first amount is below a threshold.

The report may include the first amount and the second amount. The report may include a map indicating a location of the truck and a change between the first amount and the second amount.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein.

DETAILED DESCRIPTION

Figure 1:
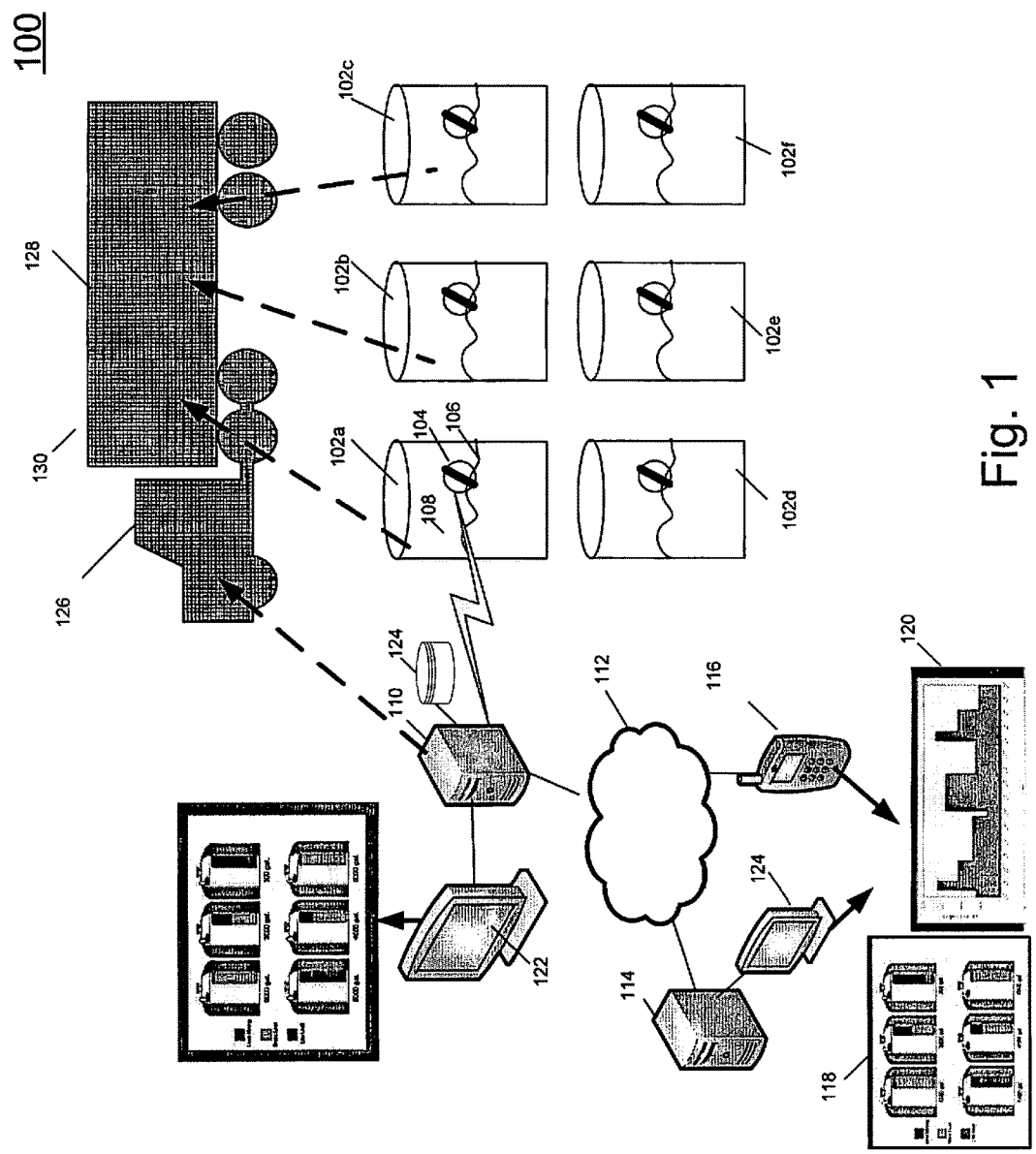
FIG. 1 shows a system drawing of a monitoring system in accordance with an embodiment of the disclosure.
Figure 2:
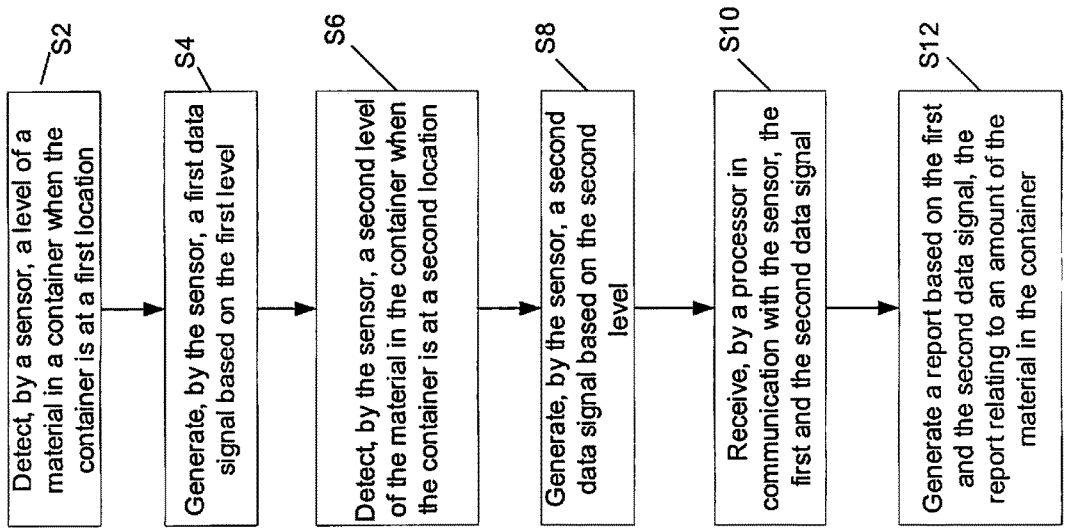
FIG. 2 shows a flow diagram illustrating a process which could be performed in accordance with an embodiment of the disclosure.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. Embodiments of the disclosure provide for one or more components to be new, used, and/or retrofitted to existing machines and systems.

Referring now to FIG. 1, there is shown a system 100 effective to monitor an amount of chemicals in portable containers, in accordance with embodiments disclosed herein. System 100 includes one or more containers 102, a processor 110, and a network 112. Focusing on container 102 a, as illustrative of the containers shown, each container 102 may include a level sensor 104 and a chemical material 106. Chemical material 106 may be a material used in a subterranean formation stimulation process such as fracturing.

Material 106 may include, for example, a carrier fluid, a polymer such as guar, a cross-linker, a propping agent, non-emulsifiers, formation cleaners, acids, bases, buffers, oxidizers, polymer slurries, enzymes, friction reducers, breakers, temperature stabilizers, boron, zirconium, titanium cross inkers, scale inhibitors, oxygen scavengers, hydrogen sulfide scavengers, chemicals used in fracturing, drilling or agriculture, etc.

Level sensor 104 may be effective to monitor a level of chemical material 106 in container 105. For example, level sensor 104 may be a MASSA M-3 level sensor in a chemical resistant housing with NATIONAL PIPE TAPER threads such as a MAGNETROL MODEL R82-516-011 radar head, etc. Level sensor 104 may include an antenna and be capable of sending a spread spectrum radio signal indicative of a level of material 106 in container 102. In an example, sensor 104 may be effective to send a data signal through a communication link 108 to processor 110 every about 0.5 to about 60 seconds indicating a level of material 106 in container 102. Sensor 104 may be powered by lithium batteries.

As containers 102 may be portable, processor 110 may receive data signals relating to levels of material 106 when container 102 is at more than one location. Processor 110 may process these data signals and generate a report, such as on display 122, indicating an amount of material in container 102.

Communication link 108 may include wireless communication and/or wired communication. Processor 110 may be a master monitoring panel in communication with a display 122. Processor 110 may include a WST-200 radio monitor such as those available from NTE AUTOMATION. The radio monitor may be effective to receive data through communication link 108 and can thereby enable communication between processor 110 and containers 102. Processor 110 may generate a report on display 122 including a graphical image indicating amounts of material 106 in containers 102 at multiple times and/or locations. The graphical image may indicate an amount of material 106 in container 102, whether the amount of material is changing, whether the amount of material is static, and whether the amount is below a threshold percentage indicating that the material should be replenished.

Processor 110 may also send data relating to amounts of materials 106 over network 112 to a processor such as a user's phone and/or processor 114 so that the processor 112, 114 may be able to generate applicable reports 118, 120. Network 112 may include, for example, a cellular network including cell towers, a satellite network, or direct communication. Network 112 may include the Internet network and communication could be through, for example, TCP/IP (transfer connect protocol/internet protocol).

Processor 110 may be in communication with a memory 124. Memory 124 may include a list of containers and threshold amounts. When processor 110 determines that an amount of a material in a particular container has dropped below the respective threshold, based on communication with memory 124, processor 110 may generate an alarm. Processor 110 may send the alarm over network 112 to a processor such as smart phone 116 or processor 114. For example, processor 110 may generate a phone call and/or text message based on the alarm. A user may view data processed by processor 110 on a display 124 through a web interface using processor 114. For example, information regarding a last delivery to a container, the delivery amount, and container level or amount history, may be displayed on display 124 by processor 114.

System 100 may be used with a truck 130 including a cab 126 and trailer 128. Processor 110 may be placed in a cab 126 of truck 130 and containers 102 may be placed in trailer 128. Processor 110 may communicate with a positioning system such as a GPS (global positioning system) and thus monitor a location of cab 126 and amounts of materials 106 in containers 102. In examples where truck 130 is used, when cab 126 is in range of sensor 104 in container 102, processor 110 may record an identifier of trailer 128 so that processor 110 may keep track of which cab 126 is attached to which trailer 128. As truck 130 moves, processor 110 may generate information regarding a location of truck 130 over time. As amounts of material 106 are also monitored, processor 110 may generate a map of where truck 130 has travelled and when and where containers 102 were filled and/or emptied.

Among other benefits, using a system in accordance with this disclosure a user can realize inventory control of materials anywhere in the world. A system may use bulk storage of chemicals reducing a footprint of a fracturing job. Inventory management may be performed at all stages of a fracturing process. Inventory records may be kept for years and may be reconciled. Customers may be invoiced quicker. A fracturing job may be safer with fewer spills as fewer hose connections need to be made. Freight charges may be reduced. Inventory adjustments and write offs, man hours, trailer fleet rental, third party hauling, tote disposal, and partial tote handling, may be reduced. In an example, a system may measure 200 different portable containers. Measurement may be made with an accuracy of about 0.05%.

Referring now to FIG. 1, there is shown a process which could be performed in accordance with an embodiment of the invention. The process could be performed using, for example, system 100 discussed herein.

As shown, at step S2, a sensor may detect a level of a material in a container when the container is at a first location.

At step S4, the sensor may generate a first data signal based on the first level.

At step S6, a sensor may detect a level of a material in a container when the container is at a second location.

At step S8, the sensor may generate a second data signal based on the second level.

At step S10, a processor in communication with the sensor may receive the first and the second data signal.

At step S12, the processor may generate a report based on the first and the second data signal, the report relating to an amount of the material in the container.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure presented herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of any claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A system effective to monitor an amount of a chemical material, the system comprising:
    a plurality of portable containers, wherein the chemical material is within an at least one of the plurality of portable containers;
    a sensor operatively associated with the at least one of the portable containers, the sensor effective to detect a first level of the chemical material in the at least one portable container when the at least one portable container is at a first location and to generate a first data signal based on the first level, and the sensor is also effective to detect a second level of the chemical material in the at least one portable container and to generate a second data signal based on the second level; and
    a processor in communication with the sensor, whereby the sensor is able to communicate the first data signal and the second data signal to the processor, and the processor is effective to receive the first data signal and the second data signal, and effective to generate a report based on the first data signal and the second data signal, the report relating to an amount of the chemical material in the at least one container;

wherein the processor is in communication with a database, and the processor generates a signal when the amount is below a threshold, wherein the processor is effective to send the report over a network to at least one of a computer display proximate to the first location, a website, and a mobile application, wherein each remaining portable container of the plurality of portable containers comprises at least one respective sensor associated therewith, wherein the chemical material is useable in connection with an oilfield operation, wherein the report further comprises information indicating a location of the at least one portable container, and information about a change in the amount of the chemical material, and wherein at least two of the plurality of portable containers are disposed on a transport vehicle.

2. The system of claim 1, where the sensor is effective to detect a second level of the material in the portable container when the portable container is at a second location and to generate a second data signal based on the second level, and to send the first data signal and the second data signal to the processor, and wherein the report is further based on the second data signal.

3. The system as recited in claim 1, wherein the processor is in communication with a database and the processor is effective to generate an alarm when the first level is below a threshold.

4. The system as recited in claim 1, wherein the report includes information related to a change in the amount, wherein the processor is in a cab of the transport vehicle.

5. The system as recited in claim 1, wherein: the processor is a first processor; the system further comprises a second processor, wherein the first processor is effective to send the report over die network to the second processor, wherein the second processor is effective to display the report on a display, and wherein the second processor is effective to communicate with the first processor using a web interface.

6. A system effective to monitor an amount of chemical material, the system comprising:
a truck further comprising a cab and a trailer;
a container in the trailer;
a chemical material in the container;
a sensor operatively associated with the container, the sensor effective to detect a first level of the chemical material in the container when the truck is at a first location and to generate a first data signal based on the first level, and the sensor is also effective to detect a second level of the chemical material in the container and to generate a second data signal based on the second level; and
a processor in communication with the sensor, whereby the sensor is able to communicate the first data signal and the second data signal to the processor, and the processor is effective to receive the first data signal and the second data signal, and effective to generate a report based on the first data signal and the second data signal, the report relating to an amount of the chemical material in the container,
wherein the processor is in communication with a database, and the processor generates a signal when the amount is below a threshold, wherein the processor is effective to send the report over a network to at least one of a computer display proximate to the first location, a website, and a mobile application, wherein the chemical material is useable in connection with an oilfield operation, wherein the report further comprises information indicating a location of the container, and information about a change in the amount of the chemical material.

7. The system as recited in claim 6, wherein the processor is in communication with a database and the processor is effective to generate an alarm when the first level is below a threshold.

8. The system as recited in claim 7, wherein the report includes a map indicating a location of the truck.

9. The system as recited in claim 1, wherein the chemical material comprises guar.

10. The system as recited in claim 8, wherein the chemical material comprises guar.

11. A system effective to monitor an amount of chemical material, the system comprising:
a portable container;
a chemical material in the portable container;
a sensor associated with the portable container, the sensor effective to detect a first level of the chemical material defined by a first amount of the chemical material in the container when the container is at a first location and to generate a first data signal based on the first level, detect a second level of the chemical material defined by a second amount of the chemical material in the container and to generate a second data signal based on the second level, and send the first and second data signal to a processor; and
a first processor in communication with the sensor, the first processor effective to receive the first and second data signal and effective to generate a report based on the first and the second data signal, the report relating to an amount of the chemical material in the container; the first processor effective to send the report over a network to a second processor,
wherein the report further comprises information indicating a location of the portable container, and information about a change in the amount of the chemical material, wherein the chemical material comprises guar and is useable in connection with an oilfield operation, wherein the system further comprises a plurality of additional portable containers, each of the additional containers having a respective sensor operably configured for measuring chemical material, and wherein the processor is in communication with a database and the processor is effective to generate an alarm when the amount of chemical material is below a threshold.

* * * * *